Figure 1:
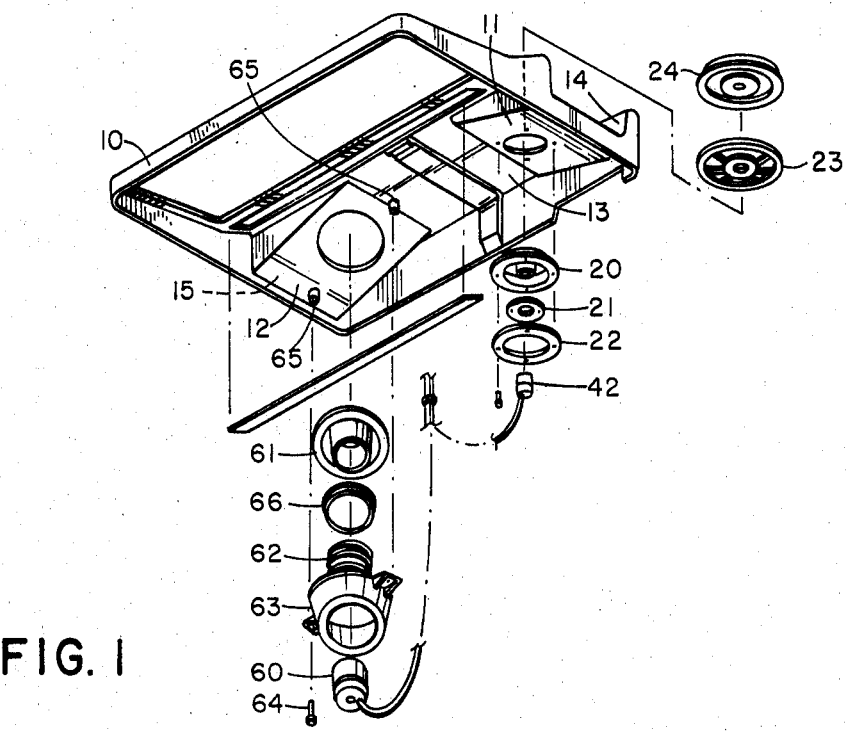

United States Patent [19]

Busche et al.

[11] 4,350,846
[45] Sep. 21, 1982

[54] ACOUSTIC MOUNTING AND COUPLER FOR A TELEPHONE HANDSET

[75] Inventors: Alan C. Busche, Dorchester; Karlo B. Simonsen, London, both of Canada

[73] Assignee: Northern Telecom Limited, Montreal, Canada

[21] Appl. No.: 203,990

[22] Filed: Nov. 4, 1980

[51] Int. Cl.³ ............................................. H04M 1/14
[52] U.S. Cl. .................................... 179/1 C; 179/2 C
[58] Field of Search ...................... 179/1 C, 2 C, 6.12, 179/184

[56] References Cited

U.S. PATENT DOCUMENTS

| 3,733,437 | 5/1973 | Keith | 179/2 C |
| 3,992,583 | 11/1976 | Davis et al. | 179/2 C |
| 4,158,106 | 6/1979 | Mason | 179/2 C |
| 4,246,444 | 1/1981 | Mason | 179/2 C |
| 4,314,099 | 2/1982 | Jeffries et al. | 179/1 C |

Primary Examiner—G. Z. Rubinson
Assistant Examiner—W. J. Brady
Attorney, Agent, or Firm—Sidney T. Jelly

[57] ABSTRACT

An acoustic mounting and coupler, for coupling a transducer of a handset to a transducer of a terminal or similar form of apparatus, such as a visual display terminal for deaf users, has a flexible tubular member attached to the housing of the terminal. At the upper end of the tubular member is a flexible disc having a plurality of readily deformable annular ribs. The tubular member provides for vertical movement and some tilting. The ribs give good air sealing between the handset and coupler. Ambient noise input is reduced and mechanical vibration to the transducer in the terminal is also reduced. Some degree of variation in geometry and dimensions of the handset can be accommodated. Some laxity in placement of the handset can also be accommodated.

10 Claims, 12 Drawing Figures

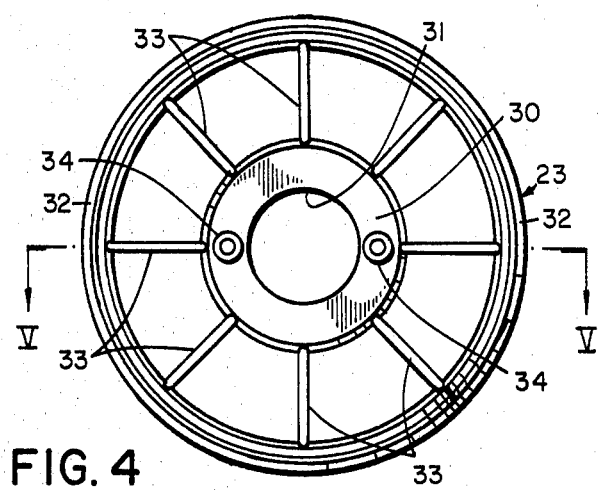
FIG. 4
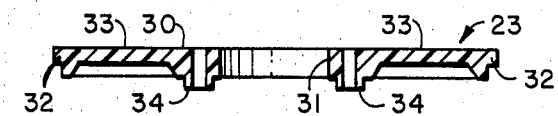
FIG. 5
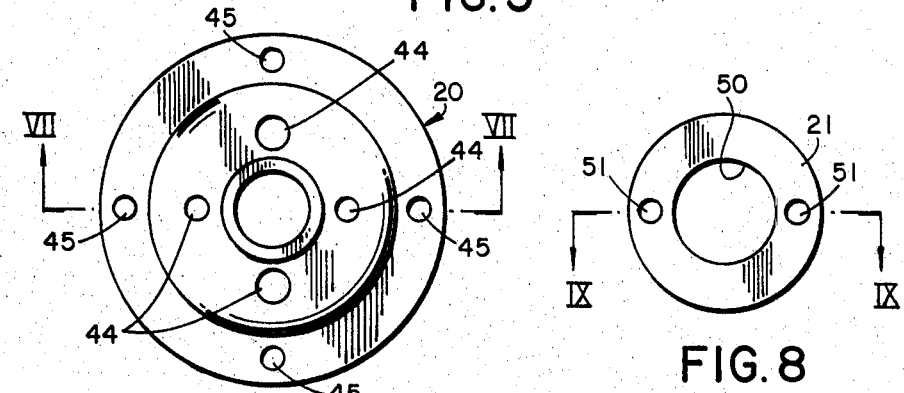
FIG. 6
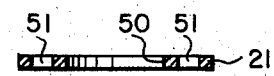
FIG. 8
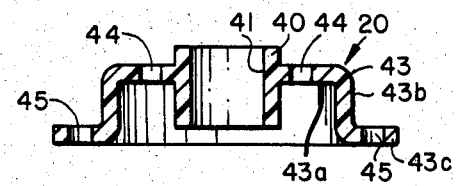
FIG. 7
FIG. 9

ACOUSTIC MOUNTING AND COUPLER FOR A TELEPHONE HANDSET

This invention relates to an acoustic mounting and coupler for a microphone in telecommunications apparatus, and is particularly concerned with the mounting and coupler for a microphone which is to be coupled to a telephone handset for transfer of signals from the receiver of the handset to the microphone.

One use of such a device is in telephone sets for deaf people. Users who are deaf are provided with an apparatus or terminal which receives signals from the telephone set transmitter and produces a visual representation. The apparatus or terminal can be provided with a key board and the user can type out messages which, by signal transfer from the apparatus to the handset receiver, enables such signals to be transmitted to another user also having a similar apparatus or terminal with visual reproduction, and keyboard. The two users can thus converse by typing or keying their conversations back and forth. The signals are generally in frequency form, such as is described by the term "Frequency Shift Keying", being similar to that used in Teletype, also referred to as Baudot Code.

A further use is for data terminals, or other terminals, in which signals received by a telephone handset can be input into the apparatus, with or without a visual display. Signals can also be returned from the apparatus to the handset.

Problems arise in coupling the transducers of the handset, that is the receiver and the transmitter, to the transducers of the apparatus or terminal. External noise pickup by the microphone of the apparatus can be high enough to interfere with signal transfer. Ambient acoustic noise can enter the microphone if a good air seal is not obtained between the telephone handset and the acoustic coupler. Noise can be transmitted to the microphone in the form of mechanical vibration through the support and coupler housing. The quality of the seal between the handset and coupler is affected by positioning of the handset and on dimensional variations in handsets.

The present invention provides a mounting for a telephone handset in which the base transducer is resiliently mounted, with a flexible sealing member which seals against the handset. In particular, the invention provides a flexible resilient mounting of a microphone with good vibration isolation between base and coupler, and a high degree of acoustic coupling to the receiver of a handset, with a good acoustic sealing of the handset and with some degree of accommodation for variations in position of the handset relative to the base.

Figure 12:
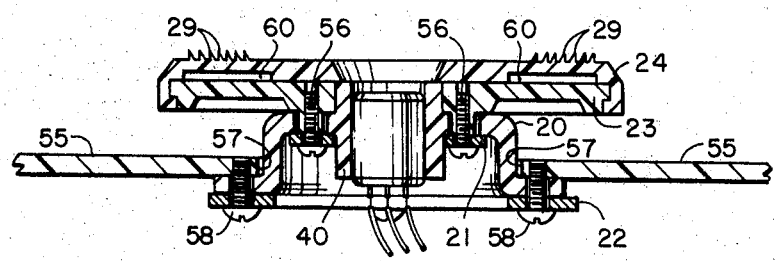

The invention will be readily understood by the following description of an embodiment, by way of example, in conjunction with the accompanying drawings, in which:

FIG. 1 is an exploded view of the top of a base or terminal, illustrating the transducer mountings;

FIG. 2, 4, 6, 8 and 10 are plan views of the various items of a mounting and FIGS. 3, 5, 7, 9 and 11 are cross-sections on the lines III—III; V—V; VII—VII; IX—IX and XI—XI of FIGS. 2, 4, 6, 8 and 10 respectively, FIGS. 2, 6, 8 and 10 being top plan view and FIG. 4 a bottom plan view;

FIG. 12 is a cross-section through an assembled mounting.

As illustrated in FIG. 1, a top member 10 of a base or terminal, has, at a rear portion, two spaced apart inclined surfaces 11 and 12 joined by a flat center surface 13. The surfaces 11 and 12 are inclined downward and outward. The surfaces 11 and 12 form the bottom surfaces of two spaced apart recesses 14 and 15 which receive the two ends of a handset. In the example of FIG. 1, recess 14 is for the receiver end of the telephone handset and recess 15 is for the transmitter end.

The particular embodiment described hereafter is concerned with the mounting of the microphone at the recess 14 and the coupling of the microphone to the receiver of the handset.

The mounting and acoustic coupling assembly comprises a flexible, resilient, member 20 and washers 21 and 22 which are positioned beneath the recess and a plate 23 and a flexible disc 24 which are positioned above the recess, the material of the top member forming the bottom of the recess being sandwiched therebetween. The individual parts or members are illustrated in FIGS. 2 to 11.

Figure 2:
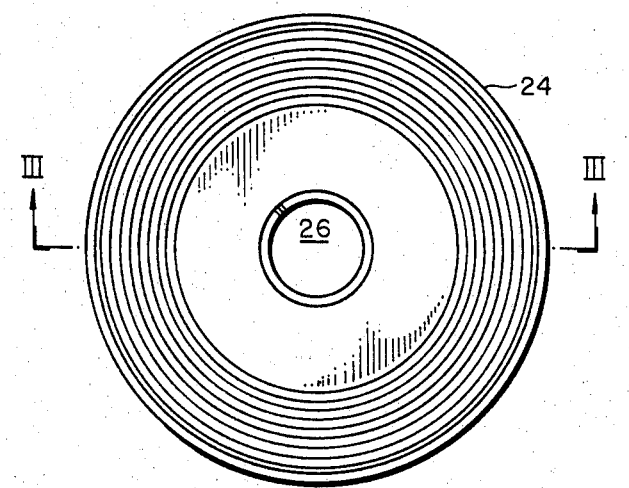
Figure 3:
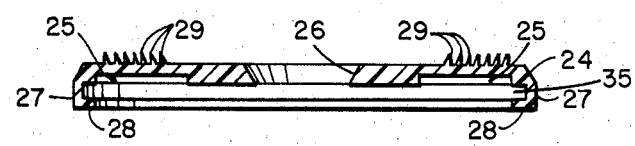

FIGS. 2 and 3 illustrate the flexible disc 24. The disc has a central aperture 26 and a downwardly extending rim 27 with an inwardly extending annular rib 28 at the lower end of the rim 27. On the top surface of the disc 24 are formed a plurality of concentric flexible annular ribs 29. These ribs 29 are triangular in cross-section, each having an acute pointed cross-section, to provide a very flexible and readily collapsed or deformed structure. An annular recess 25 is formed in the lower surface of the disc.

The plate 23 is, in the example of FIGS. 4 and 5, in the form of a disc 30 having a central aperture 31, an outer rim 32. Radial members 33 can be provided. On the bottom surface of the central disc 30 are two internally threaded hollow bosses 34. The rim 32 is of a thickness which corresponds to the recess 35 formed by the annular rib 28 and the rim 27 of the flexible disc 24. The plate is of rigid, or substantially rigid material, for example metal, but may also be of plastic, and the flexible disc is of a flexible resilient material such as a synthetic rubber. The flexible disc 24 snaps on over the plate 23.

FIGS. 6 and 7 illustrate the flexible resilient member 20. This member has a central hollow boss 40, the aperture 41 in the boss, in the example, being of a diameter to be a push fit on a microphone 42 in FIG. 1. Extending from the outer periphery of the boss is an annular flange 43. The flange 43 extends first outwards, inner portion 43a, then downwards (as seen in FIG. 7), central portion 43b, and then outwards, outer portion 43c. Holes 44 and 45 are formed in the portions 43a and 43c respectively.

FIGS. 8 and 9 illustrate washer or ring 21, generally of metal, having a central aperture 50 which is a clearance fit over the boss 40 of the flexible member 20. Two holes 51 are provided, to align with two of the holes 44 in the member 20.

Figure 10:
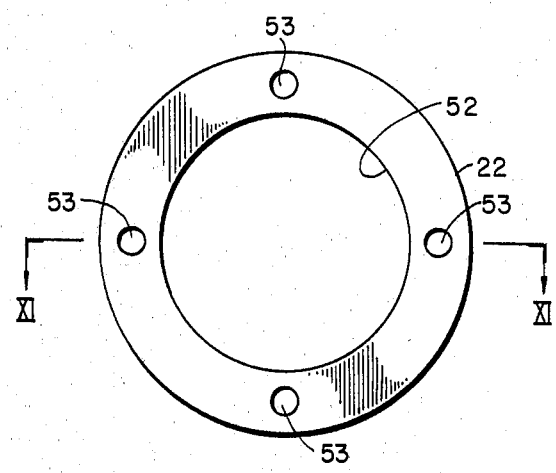
Figure 11:
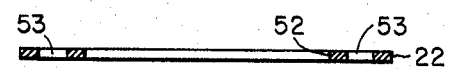

FIGS. 10 and 11 illustrate the washer or ring 22. This is generally of metal and has a central aperture 52 which is of a diameter approximating to the outside diameter of the portion 43b of the flexible member 20. Holes 53 are provided, to align with holes 45 in the member 20.

FIG. 12 illustrates the mounting and coupling assembly assembled to the base 10. The bottom part of recess 14 is indicated at 55. The flexible disc 24 is mounted on the plate 23 and the resilient flexible member 20 is attached to the plate via, for example, tapping screws 56 and washer or ring 21. The screws 56 pass through the holes in the portion 43a of the member 20 and into the bosses 34 of the plate. The bottom part 55 of the recess 14 has an aperture 57 therein through which the flexible member can extend, with some clearance. The portion 43c of flexible member 20 is attached to part 55 by the washer or ring 22 and tapping screws 58. The microphone 42 is a push fit in the hollow boss 40.

When a handset is placed on the base or terminal, the transmitter and receiver ends are positioned in the recess 15 and 14, and the center part of the handset is positioned over the flat center surface 13 (FIG. 1). In the present example, the receiver end of the handset resting on the disc 24, the member 20 will distort slightly. At the same time the ribs 29 also collapse or distort. The ribs 29 provide a good air seal between the handset and the disc 24 to exclude ambient noise. The member 20 flexes to allow for variations in the form of the handset and the pocket 60, formed between the disc 24 and the plate 23, by recess 25, below the ribs 29, reduces the effective stiffness in the sealing area. This improves the ability to conform to the handset surface but also assists in attenuating mechanical vibration. The member 20 can move vertically on its central axis through the boss 40 and can also tilt, permitting tilting of the plate 23 and disc 24. Thus some vertical variation in height and limited angular variations can be accommodated. Also some lateral displacement of the handset receiver relative to the bore 40 of member 20 can be accommodated. Such variations and displacement can arise from manufacturing tolerances and because of differing forms of handset.

The flexible member 20 also isolates the microphone 42 from vibration originating from or imposed upon the base or terminal.

In the arrangement illustrated in FIG. 1, a speaker 60 is pushed into a sealing and mounting member 61 which is held against the undersurface of the recess 15 via a compression spring 67 and a cap 63 which is attached to the undersurface of the recess by screws 64 screwing into bosses 65. An annular cap 66 fits over the end of the spring 62 remote from cap 63. The member 61 extends through an aperture 67 in the recess 15 and the transmitter end of the handset rests on the end of the sealing and mounting member 61 and a certain amount of resilient movement of the member 61 is available to ensure good contact between handset and member 61. A similar mounting can be provided for the speaker 60 as is provided for the microphone 42.

What is claimed is:

1. An acoustic mounting and coupler for a telephone handset, comprising:
   a tubular flexible resilient member including a central hollow boss for reception of a transducer therein and an annular flange extending outwardly from the boss, the flange having an inner portion extending outwards, a central portion extending parallel to the boss from an outer edge of said inner portion and an outer portion extending outwards from said central portion;
   means for attaching said outer portion of said annular flange to a support member, said tubular member extending through an aperture in said support member;
   a substantially rigid plate attached to said inner portion of said annular flange and extending over said support member and presenting an upper surface facing away from said support member;
   a flexible disc mounted on said plate, and including a plurality of annular flexible members on an upper surface;
   said plate and said disc each having a central aperture aligned with said hollow boss of said tubular flexible member.

2. Apparatus as claimed in claim 1, said central hollow boss having an upper end and a lower end, said annular flange extending from a position intermediate said upper and lower ends, said central portion of the annular flange extending in a downwards direction relative to said hollow boss.

3. Apparatus as claimed in claim 1, said plurality of annular flexible members on the upper surface of said flexible disc comprising a plurality of annular ribs, each rib of substantially triangular cross-section having an acute angle upper point.

4. Apparatus as claimed in claim 2, said other portion of said annular flange extending below the plane of the lower end of the central hollow boss.

5. Apparatus as claimed in claim 2, said upper end of said hollow boss extending up within said aperture in said plate.

6. Apparatus as claimed in claim 1, said flexible disc including an annular recess in a lower surface, aligned with said annular flexible members.

7. Apparatus as claimed in claim 1, said flexible disc including a downwardly extending rim and an inwardly extending annular rib at a lower end of the rim to define an annular recess, said flexible disc snapping over said plate, the annular recess of the flexible disc fitting over the rim of said plate.

8. Apparatus as claimed in claim 1, including a transducer positioned in said hollow boss of said tubular flexible member, said transducer a push fit in said hollow boss.

9. Apparatus as claimed in claim 1, said outer portion of said annular flange attached to said support member, said support member comprising a top member of a terminal, said top member including two spaced apart recesses for the reception of a receiver end and a transmitter end of a telephone handset, said tubular flexible member attached to said support member in one of said recesses.

10. Apparatus as claimed in claim 9, said tubular flexible member attached to said support member in the recess for reception of the transmitter of said handset, said transducer comprising a microphone.

* * * * *